United States Patent

Bradbeer

Patent Number: 5,130,543
Date of Patent: Jul. 14, 1992

[54] DIRECTION SENSITIVE ENERGY DETECTING APPARATUS

[76] Inventor: Peter F. Bradbeer, 50 Hag Hill Rise, Taplow, Maidenhead, United Kingdom, SL6 OCT

[21] Appl. No.: 543,775
[22] PCT Filed: Jan. 19, 1989
[86] PCT No.: PCT/GB89/00051
  § 371 Date: Jul. 18, 1990
  § 102(e) Date: Jul. 18, 1990
[87] PCT Pub. No.: WO89/06806
  PCT Pub. Date: Jul. 27, 1989

[30] Foreign Application Priority Data

Jan. 19, 1988 [GB] United Kingdom .......... 8801143
Apr. 8, 1988 [GB] United Kingdom .......... 8808304

[51] Int. Cl.$^5$ .......................... G01S 5/04; G01S 3/28
[52] U.S. Cl. .......................... 250/342; 342/432
[58] Field of Search .......................... 250/342; 342/432

[56] References Cited

U.S. PATENT DOCUMENTS

| | | | |
|---|---|---|---|
| 1,820,571 | 4/1931 | Krulsi | 342/432 |
| 3,370,293 | 2/1968 | Green | 342/432 |
| 3,495,249 | 2/1970 | Downie | 342/432 |
| 3,665,481 | 5/1972 | Low et al. | 342/432 |
| 3,893,120 | 7/1975 | Trenam | 342/432 |
| 4,833,478 | 5/1984 | Nossen | 342/432 |

FOREIGN PATENT DOCUMENTS

| | | |
|---|---|---|
| 98235 | 1/1984 | European Pat. Off. |
| 2830308 | 1/1980 | Fed. Rep. of Germany |
| 2389847 | 12/1978 | France |
| 1196095 | 6/1970 | United Kingdom |
| 1390820 | 8/1972 | United Kingdom |
| 87/03696 | 6/1987 | World Int. Prop. O. |

Primary Examiner—Janice A. Howell
Assistant Examiner—Richard Hanig
Attorney, Agent, or Firm—Davis, Bujold & Streck

[57] ABSTRACT

A direction sensitive energy detecting apparatus characterized by having a pair of energy receiving and transmitting devices of different polar characteristics and so disposed that they define together one end of a path in such a way as to be coincident with each other; with the sensor being adapted to give two first outputs at least one of which is variable as a function of the direction of the path and the detector having ratiometric means for generating a second output which is a function of the ratio of the two first outputs and is variable only in response to changes in direction.

20 Claims, 5 Drawing Sheets

DIRECTION SENSITIVE ENERGY DETECTING APPARATUS

FIELD OF THE INVENTION

This invention relates to direction-sensitive energy detecting apparatus, for detecting at least the direction of an object or other matter positioned in space.

BACKGROUND OF THE INVENTION

Numerous kinds of apparatus for detecting the position of something positioned in space are known.

Known methods to determine the direction of a beam of, for instance, electromagnetic energy often employ moving parts, which can be costly, complex and not always reliable. One example is the rotating antenna used in radar, in which the distance to a remote reflector is a calculated by measuring the time taken for the radar beam to travel from the transmitter to the reflector and back. Since the propagation speed is known, this time interval can be converted to a distance measurement. The actual position of the object can then be determined, the antenna direction at the time of measurement being known.

Many devices acting as transmitters and/or receivers of acoustic and electromagnetic energy have respectively an output power or input sensitivity which varies with the angular displacement relative to some datum direction in space. This property will be referred to as a polar characteristic. Examples of devices which exhibit a polar characteristic are radio or radar transmitting and receiving antennae, ultrasonic transducers, microphones, light emitting diodes (LED's), and photoelectric receivers. In many instances it is possible to control the polar characteristics of the device during manufacture.

Optical direction finding equipment is also well known in various forms, such as those used in navigation, surveying etc.

There is a need to establish the direction of an object from an observer who wishes to determine other factors such as the position of an object, or whether it is moving (and in that case, possibly also its direction of movement). Position finding apparatus is for example used in many forms in gunnery and navigation. Movement detectors are also important in security systems, for example for detecting an intruder.

Movement detectors, using the Doppler effect, are widely used in security systems to detect entry of intruders and initiate alarms or control other actions.

These detectors operate by transmitting energy of a specific wavelength into the space in their vicinity. The transmitted energy (or some of it) is reflected back, by objects in the space, to a receiver sensitive to this energy. The reflected signal is then mixed with a reference signal having identical wavelength to that of the transmitted energy. Any difference in frequency between the reflected signal and the reference signal causes low frequency amplitude modulation at the mixer output. If the reflecting objects in the vicinity of the device are stationary, then the transmitted and reflected signal frequencies are identical; but if the objects are moving there is a frequency differential between the received signals. This is proportional to the velocity of the moving objects (s), resulting in amplitude modulation of the mixed signal. By detecting the presence of this amplitude modulation it is therefore possible to determine that there is a moving object within the vicinity. This information may be used tot rigger an alarm sequence or any other desired control action. If the transmitter and receiver are located together, the speed of the object in a radial direction can also be measured by determining the frequency of the resultant amplitude modulation at the output of the mixer.

Since any number of energy waves, simultaneously present in the medium in which they propagate, will mix together to form an additive signal, it is possible to use this property as a readymade mixing stage. It is therefore quite common in the design of movement detectors to supply the reference signal by causing a proportion of the transmitted energy to "leak" directly into the receiving device. The reflected energy then mixes with the reference signal and the receiver receives the resulting added signal. By demodulating (rectifying) the received signal, and passing this signal through a low-pass filter, any resultant amplitude modulation within the passband of the filter will be extracted from the composite received signal. This process is commonly described as "envelope following" or "demoudlation". The same technique is used in amplitude modulated (A.M.) radio reception, where the audio information is extracted from the amplitude component of the received signal.

In microwave motion detectors, the receiving diode receives and demodulates the microwave energy in one step, since its electrical output is only a function of the amplitude of the received microwave energy. This property obviates the need for rectification of the received signal and the subsequent low-pass filter stage.

The demodulated signal will contain a d.c. component corresponding to the average received signal amplitude. Since the effect of movement of any reflecting object in the vicinity of a detector is to introduce a.c. components to the demodulated signal, the d.c. component may be removed from the latter prior to any further signal analysis, without detriment to the intended function. The magnitude of the remaining a.c. component will be dependent on the angle of incidence of the received reflected signal and on its amplitude. It will be appreciated that the amplitude of the reflected signal at the point of reception will depend on the transmitted power, the reflectivity of the moving object, the surface area of its reflecting surface, and the distance and attenuation of the medium between the transmitter, the object, and the receiver.

Motion detectors currently used commonly suffer from false alarms brought about by, for instance, moving curtains or convection currents set up by central heating radiators etc.

The most popular current form of intruder detector is the passive infra-red motion (PIR) detector. These detectors respond to black body radiation from a human or other animate body, though they can be used to detect any moving object provided there is a temperature difference of at least 0.25° C. between the object and its background or surroundings. These detectors use optical sensors, each comprising a pyroelectric sensing element in combination with suitable optical means to chop the incident radiation as the object moves.

These optical chopping has been achieved in various ways, one being by the use of a multi-faceted mirror with a pyroelectric sensor at the common focus of the facets. As the object moves across the field, it comes in and out of view, so modulating the incident radiation which causes the sensor to produce an appropriate output signal. Another example of a known chopping device is a Fresnel lens array (a series of lenses radially arranged with coincident focal points) with a pyroelectric sensor at the common focal point. Radiation from an object traversing the field passes through a number of the lenses with consequent chopping of the incident radiation.

Conventional pyroelectric detectors can also be activated by moving air currents, e.g. those associated with central heating, curtains or other harmless moving objects, and are also usually sensitive to incandescent lamp radiation if it has any significant modulation component.

Another type of detector system is a flame detecting system for locating the presence and the direction or position of a fire. Fires often occur out of doors in daylight. Under these circumstances, early detection of a fire may be very difficult where the flame is very small and the daylight is bright. Conventional fire detection systems often include a flicker frequency analyser facility which enables the system to discriminate between the flickering energy characteristic of a flame and other received energy such as sunlight.

Fire detection systems commonly use pyroelectric sensors. However, as is well known, pyroelectric sensors are prone to suffer from microphony effects and self-induced noise, which in currently-known systems seriously limit the range of distance within which detection is possible. At the same time, it is normal in flame detection systems to include a flicker frequency analyser (FFA) to compare the input from the sensor with a set of predetermined criteria for identifying the flame as such by detection of flicker.

DEFINITIONS

The word "sensor" is used in this application to mean a receiving device capable of giving an output signal in response to stimulation by energy in a form to which the device is sensitive, and having values of its characteristic parameters within the ranges to which the device is sensitive. A sensor may be either omnidirectional or directional, i.e. adapted so that the amplitude of its output signal, for a given value of power in the energy input, varies according to the direction from which the energy is received, this direction being definable with reference to a fixed datum. A directional sensor may be of an inherently directional kind, or it may be merely capable of being made directional by use of appropriate means external to the sensor, in the latter cases such external means associated with the senor may for instance be a reflecting or refracting means, an aperture-type beam restrictor, an acoustic horn, or any other means suitable in all the circumstances for controlling directional characteristics.

Similarly the word "transmitter" as used in this application means anything that emits energy of some kind so that the energy propagates through space. Thus a transmitter may for example be a body or device, or a flame, or anything else having a temperature above 0° K. A transmitter may be either omnidirectional or directional, i.e. adapted so that the amplitude of its output signal varies according to the direction in which the energy is emitted. As with a directional sensor (receiver), a directional transmitter may be inherently directional or capable of being made directional by appropriate associated external means.

An "energy source" maybe itself a transmitter, directional or otherwise, or a body, surface or other means for retransmitting energy received from such a transmitter, e.g. a reflector.

In a sensor, the term "equivalent centre of reception" is used in this application to mean the point at which all the energy incident on the energy sensitive part of the sensor may be deemed to be acting, in an analagous sense to that in which the weight of a body maybe deemed to act at its centre of gravity.

In a transmitter or other energy source, the term "equivalent centre of transmission" is similarly used to mean the point from which all the energy propagated by the source may be deemed to be propagated.

The term "energy line" is used in this application to mean a two-dimensional line, i.e. one having no width, joining the equivalent centre of transmission of an energy source to the equivalent centre of reception of a sensor. This then represents the mean or resultant path of such energy as is received by the sensor as it passes from source to sensor, and will usually be straight, though in some circumstances it may not be straight.

The energy referred to may be light, whether visible or not, heat, or any other form of electromagnetic energy, or acoustic energy, and the source transmitting it directly to the detector or apparatus may be such that the energy is radiated or beamed from that source; the energy may originate at the source or merely be reflected from it.

DISCUSSION OF THE INVENTION

The magnitude or amplitude of the output signal from an energy-receiving device having a given polar characteristic depends on the angle of incidence of the energy on its receiving surface, the intensity at the source itself, and the distance between source and device. If, as is usual in practice, the two last-mentioned of these are not known, it is not possible with a single, fixed, energy-receiving device to determine the direction from which the energy is coming, since the intensity of the energy at the receiving surface is not solely a function of the angel of incidence.

An object of the present invention is to provide an energy detecting apparatus including a detector giving an output signal which varies only as a function of the angular displacement, with respect to a datum, between the source and the detector, and is independent of source intensity and of the distance separating the source from the detector.

According to the invention, direction sensitive energy detecting apparatus is characterised by:

an energy detector including sensor means, for detecting energy receiving along at least one energy path extending through space from at least one energy source to the sensor means, and a pair of energy receiving or transmitting devices of different polar characteristics, comprised in either the sensor means or a said source and so disposed that (a) they define together one end of a said path in such a way as to be substantially coincident with each other, and (b) at any instant, all of the radiation received by the detector from a source, having substantially a single value of source intensity, travels substantially the same distance between the source and the sensor means.

the sensor means being adapted to give two first output signals at least one of which is variable as a function of at least the direction of the said path, and the detector further including ratiometric means for generating a second output signal which is a function of the ratio of the two first output signals, whereby the second output signal is variable only in response to changes in the said direction.

The pair of devices of different polar characteristics can thus be either part of the sensor means or part of the source. In the former case, they are at the receiving end of the path, and it is then the output signals from these sensors which either constitute the first output signals, or are processed (for example by suitable circuitry in the sensing means) to give the first output signals.

It is because the output of the detector is a ratiometric signal, in which all the variables in the output signals from the sensing means are cancelled out except that which defines the direction in which the source lies in relation to the detector, that the detector is able to identify this direction without other variables such as source intensity and distance being known.

Still considering the case where the pair of devices are sensors forming part of the detector, and where the first output signal derived from each sensor will in general vary as a function of source intensity and distance, then at least one device of the pair will have a polar characteristic such that its output signal is also a function of the direction.

Operation of the apparatus according to the invention involves reception of energy by the sensing means from an energy source, such that the two first output signals can be compared. Since this comparison must cancel unwanted parameters, so that the second output signal representing the ratio of the first output signals is a measure of direction, then if for example the two sensors are not placed physically adjacent to each other, it must be ensured that the energy traverses the same distance from the source to each sensor. Similarly if two transmitters are not physically adjacent to each other (in the aspect postulated above), energy must travel the same distance from each transmitter to the detector, so that the distance terms cancel out in the second output signal. In any case, if the two sensors or the two transmitters are spaced apart physically, the distance between them should not be a significant proportion of the total distance travelled by the energy.

In a modification, the apparatus is adapted for detecting the position of an energy source in space.

In this connection, if the polar characteristics of the receiving sensors have a constant profile when rotated about the normal axis, then the second output signal will represent a solid angle of a cone. It can then be determined that the energy source lies on the surface of a cone having a solid angle which is related in some determinable way to the second output signal. To establish the position of the energy source, energy from the latter would then have to be received by more than one detector, located at a number of different points in space. The intersections of any pair of conical surfaces, as represented by the output signals of the respective detectors, will then define a parabolic curve. The energy source will lie somewhere on this curve. By calculating a number of such parabolic curves and finding their points of intersection, the position of the energy source may be calculated, and represented in three Cartesian co-ordinates relative to the position of each of the detectors. However, this approach involves the solution of a set of simultaneous equations including quadratic equations: even with the aid of a digital computer using software specially written for the purpose (and therefore, incidentally, adding extra cost), the response may still be unacceptably slow for some applications calling for high-speed response, e.g. in very high-speed position monitoring or tracking systems.

A simple, alternative means for establishing the position of the energy source is provided by an apparatus according to the invention having position finding means including two said detectors, each comprising a said pair of energy receiving devices as the sensors of the detector, and a said ratiometric means, each pair of sensors being spaced apart from the next pair by a predetermined distance in a first plane, the two sensors of each pair having polar characteristics which are different in the first plane but substantially identical in a second plane normal to the first plane, and processor means connected with the ratiometric means of the detectors for producing an output responsive to the second output signals from the detectors and representing coordinates of the position of the source in the said first plane. Preferably, in such a case the apparatus also includes a further said position finding means in which the two sensors of each pair have polar characteristics which are different in the second plane but substantially identical in the first plane, the apparatus including further processor means connected with the said processor means of each position finding means for producing an output representing the position of the source in space.

According to another feature of the invention in which it is adapted for use as a Doppler motion detecting system, the sensor means of the detector comprises a said pair of energy receiving devices as sensors, the apparatus also including a transmitter for generating a reference signal receivable through space by the sensors both directly and at the same time by reflection from at least one body the motion of which is to be detected by the detector, each sensor being adapted to produce a Doppler output signal in response to the directly received and reflected reference signals, and the sensor means including means to convert the output signal from each sensor into a said first output signal whereby the second output signel from the ratiometric means is a function of the movement of the said body or bodies.

Since the sensors are placed close together and arranged to receive the reflected and reference signals, each sensor having different relative sensitivities at any given angle of incidence, the ratio of the magnitudes of the a.c. components of their demodulated outputs due to the motion of the body is a function of the angle of incidence only, since all other factors are common. The mixing of the reference and reflected signals could however be achieved by any suitable means, since all that is necessary is to extract and measure the peak amplitude of a.c. components in the demodulated signals from each sensor, and then to calculate their ratio.

This technique can be applied to other embodiments of the invention. The resulting information can be used to compute the position of moving bodies, or more correctly to compute the path that a moving body may take. The instantaneous radial speed of a body may be obtained by analysing the frequency of the resulting a.c. components in either of the demodulated signals as before. With the knowledge of, the path taken by the object, vector analysis may be performed so as further to define its velocity and direction.

This enables very sophisticated surveillance systems to be made, and the volume within which a motion detector would be sensitive to be accurately defined. The dimensions of this volume can be altered at will, by defining those Cartesian co-ordinates within which motion would initiate an alarm or other desirable control action.

False alarms due to moving curtains, convection currents or other harmless movement can now be reduced or eliminated, by making those areas wholly or partially insensitive. Suitable computing means may be incorporated to analyse the motion of reflecting bodies in terms of their velocity and acceleration, and thereby distinguish between human or animal motion and the motion of curtains, air currents etc. It is also possible, using the invention, to alter dynamically the sensitivity distribution in the protected area, specifically within those areas where persistent motions, of kinds inconsistent with those of an intruder, occur.

The invention is also very suitable for use in PIR detection of the movement of a body. To this end, the apparatus according to the invention may have at least one detector the sensor means of which comprises a said pair of energy receiving devices as sensors, the apparatus being a passive infra-red motion detecting system wherein each sensor comprises a pyroelectric sensor with optical chopping means for chopping radiation incident on the sensor from a moving body.

Thus the detector has two pyroelectric sensors, having different relative sensitivities at any common angle of incidence, and produces a directional output signal representing a function of the ratio of the two output signals from the sensors.

The polar characteristic of a PIR optical sensor may be controlled by making each lens (or mirror facet) with an aperture of known cross-section. In this way nay desired polar characteristic may be obtained, although it should be noted that such a characteristic will be essentially discrete.

It should be noted that the object must be moving if it is to be detected; the output signal represents the direction of the path being followed by the moving object.

Analysis of the ratiometric output signal obtained from the PIR detectors according to the invention may, using known techniques, be readily extended to include an analysis of the detected motion by a computer programmed to discriminate between movement of an intruder and that of a mere harmless, but intrusive, phenomenon such as moving air currents or incandescent lamp radiation, mentioned above.

The invention is also very suitable for use in connection with flame detection. Accordingly, the sensor means of the detector may comprise a said pair of energy receiving devices as first and second sensors, with the detector further including a pyroelectric third sensor disposed so that radiation incident on one sensor is incident on all three, and having filter means whereby the third sensor sensors radiation only within a predetermined waveband, and the sensor means including first and second means for cross-correlating the output signal from the third sensor with that from the first sensor and the second sensor respectively, so as to remove non-common signal components from the first output signals transmitted from the sensor means to the ratiometric means.

Preferably the filter means is a narrow band optical filter in a waveband characteristic of a type of flame to be detected but substantially uncharacteristic of solar radiation.

A flicker frequency analyser is preferably connected so as to receive signals responsive to at least the output signals from the third sensor. Preferably, the said first and third sensors have similar polar characteristics, the flicker frequency analyser being connected so as to receive output signals from the first cross-correlating means in parallel with the ratiometric means. The first and third sensors are preferably substantially omnidirectional.

In its broadest sense, the invention embraces embodiments of direction sensitive apparatus in which the said pair of devices having different polar a characteristics are transmitter instead of sensor or receivers. In this case, the apparatus may include modulating means for modulating, orthogonally to each other, the signals propagated as energy to the detector by the transmitters.

Alternatively, the transmitters may be arranged to propagate energy in different wavebands, the sensor means of the detector comprising a pair of sensors each responsive to energy in a respective one of the said wavebands.

The invention offers a type of direction sensitive energy detecting system which is not only extremely versatile, but which can be made very inexpensively, with the possibility of using low-cost, standard components. It may also be made physically extremely small.

The invention also offers a significant advantage by obviating the need for rotating antennae, since the update time for moving antenna systems is a function of the angular velocity of the antennae. The system described in this specification is well adapted for continuous operation, and can thus provide very fast position location with the ability to monitor the position or direction of a fast-moving energy source continuously.

All these, and other, advantages of the invention are of value for example in security systems.

The invention will now be more fully explained, and embodiments described by way of example, with reference to the accompanying diagrammatic drawings.

DIRECTION FINDING

Figure 1:
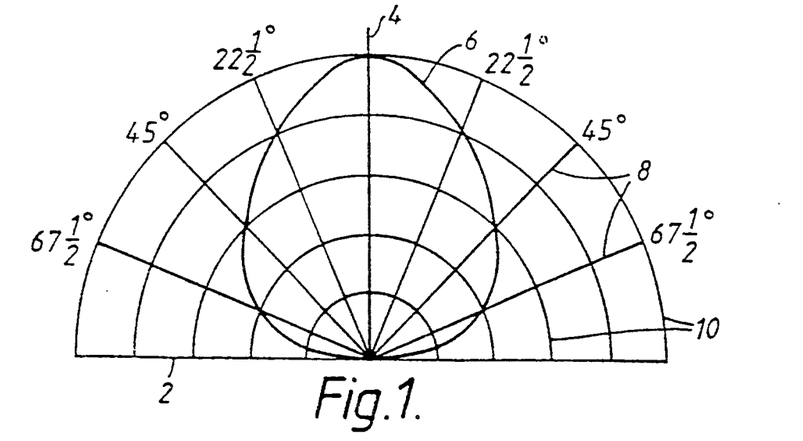
FIG. 1 shows, in polar graphical form, a typical polar characteristic for an energy-receiving sensor in one plane.

Referring first to FIG. 1, the base line 2 represents the receptor surface of a sensor for receiving acoustic or electromagnetic energy through space from a remote source. The receptor surface 2 is plane in this example, and the plane 4 normal to the surface 2 is also shown. In FIG. 1, the polar characteristic 6 is represented for a single plane perpendicular to both the surface 2 and plane 4. The radial lines 8 are the angular graduations of the polar diagram representing angle of incidence, while the concentric semicircular lines 10 represent the relative sensitivity of the sensor to the incoming energy at the receptor surface 2. The curve 6 shows how relative sensitivity varies according to the angle of incidence for an energy beam of a given power, being in this example greatest at the normal 4 and decreasing as the angle of incidence approaches 90°.

If the surface 2 is transmitting energy instead of receiving it, its power output for a given power input varies with the angle at which energy leaves the surface 2, again as shown by the curve 6. For simplicity the description will from here on mostly concentrate on the receiving function, but it should be understood that the principles are in general equally applicable to the transmitting function.

In practice many transmitters and receivers have polar characteristics which exist in three dimensions. To represent the polar characteristic in three dimensions, the radial lines 8 should be perceived as graduations of solid angles; as such, they denote the outlines of a series of cones, with an axis replacing the plane. In a receiver, these graduations represent a series of cones of vision, and in terms of a transmitter they represent a series of cones of transmission. The relative sensitivity or relative power of a device at any given solid angle is the ratio of the actual sensitivity or power at the given solid angle to the sensitivity or power measured in a direction normal to the receiving or transmitting surface of the device. In many practical sensors and transmitters, including the example shown in FIG. 1, the sensitivity or power level is at a maximum in this normal direction, i.e. along the line 4; devices can however be made, in known manner, so that the maximum occurs in some other direction.

Relative sensitivity at any instant depends on the polar characteristic and on the particular angle of incidence, or angular orientation relative to the source, that obtains at that instant. The polar characteristic may be represented mathematically as $F(\Theta)$, where $\Theta$ is the angle of incidence.

Figure 2:
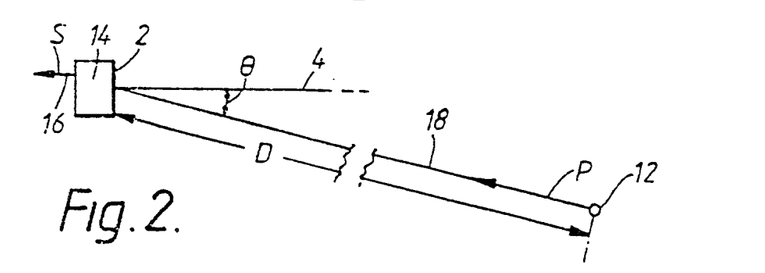
FIG. 2 illustrates how the output signal level of a single static sensor depends on various parameters.

Turning now to FIG. 2, an energy source 12 radiates energy in all directions with equal intensity. A receiving sensor 14 generates an electrical output signal on a line 16 which is directly proportional to the received energy level impinging on the radiant sensitive surface 2 of the receiver 14. The source 1 and the receiver 14 are separated by a distance D, and there is an angular displacement $\Theta$ between the direction 4 normal to the receiver surface 2 and the direction of the energy source 12. The radiated energy propagates in a beam 18 which impinges on the radiant sensitive surface 2. Considering the source 12 to be a point source of radiation, a mathematical expression may be formulated which describes the receiver output signal level (denoted by S, in terms of the source intensity (denoted by P), the distance D, and the polar characteristic function $F(\Theta)$. The expression is $$S = \frac{K \cdot F(\Theta) P}{D^2} \quad (1)$$

where K is a constant related to receiver sensitivity.

Figure 3:
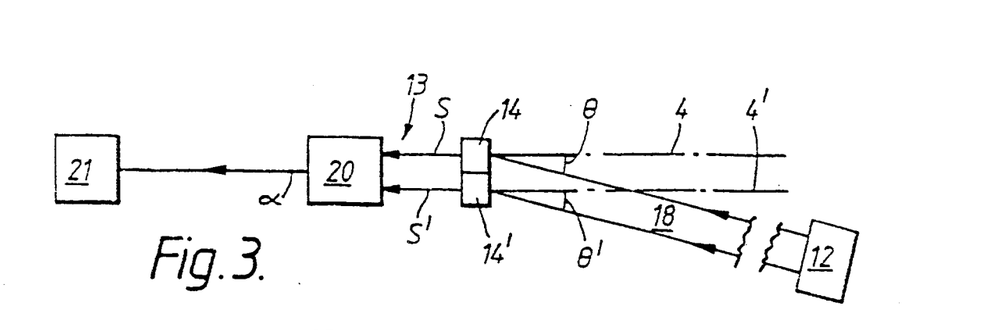
FIG. 3 shows an energy detector in one form according to the invention.

Reference is now made to FIG. 3. An energy detector 13 has a pair of sensors 14 and 14¹. These are generally similar to each other, except that they have different polar characteristics $F(\Theta)$ and $F^1(\Theta)$ respectively; the sensitivity-related constant is K for sensor 14, and $K^1$ for sensor 14¹.

The sensors 14 and 14¹ are placed as close as possible to each other, so that when a beam of energy 18 from a remote source impinges on their receptor surfaces, the angles of incidence, $\Theta$ and $\Theta^1$ respectively, differ by an amount small enough not to matter, having regard to the degree of accuracy required in the detector. Sensors such as photodiodes and ultrasonic transducers, designed to have a range of a few meters, are commercially available in very small sizes, so that the requirement that the sensors of a pair be very close together is not difficult to achieve in practice.

The two sensors 14 and 14¹ need not have the same angular orientation, but for simplicity they are shown in FIG. 3, and described in this example, as facing in the same direction, i.e. their respective normals 4 and 4¹ are parallel. A more general case will be discussed below with reference to FIGS. 7 and 8.

If the received signal levels of the sensors 14 and 14¹ are S and S¹ respectively, then S is represented by equation (1) above, and $$S^1 = \frac{K^1 F^1(\Theta) P}{D^2} \quad (2)$$

since P and D are, at least for all practical purposes, the same for both sensors.

The outputs of the sensors 14 and 14¹, carrying respective first output signals representing the received signal levels S and S¹ respectively, are fed to a ratiometric amplifier 20 of the detector 13, which generates a second output signal representing the ratio S/S¹. The value of this output signal is given by the equation $$a = C \cdot T(\Theta) \quad (3)$$

which is derived directly from equations (1) and (2), where $$a = \frac{S}{S^1}$$

$$C = \frac{K}{K^1} \text{ (a constant)}$$

$$T(\Theta) = \frac{F(\Theta)}{F^1(\Theta)}$$

Thus the second output signal $a$ from the detector is directly proportional to the ratio between the two different polar characteristic functions of the two sensors, which in turn depend on no source-dependent parameters other than direction. In other words, the detector output varies only with the angle $\Theta$. It is thus independent of both the source intensity and the distance of the source from the detector.

It should be understood that $\alpha$ is not necessarily equal to the ratio of the two received signal levels as in the above example. The ratiometric amplifiers 20 can be designed so that the signal $\alpha$ is any desired function of S and $S^1$. Where $\alpha$ is equal to or directly proportional to $S/S^1$, then if for example S is increasing and $S^1$ decreasing, both linearly, then as $S^1$ becomes very small, $\alpha$ increases very rapidly towards infinity. In order to preserve accuracy, $\alpha$ should preferably represent some kind of linear function of the ratio between S and $S^1$, for example $$\alpha = \frac{K(S - S^1)}{S + S^1}$$

where K is a constant. This may be expressed as $$\alpha = \frac{K}{\left(\frac{S}{S^1}\right)^{-1} + 1} - \frac{K}{\frac{S}{S^1} + 1}$$

The detector output signal $\alpha$ is fed to any suitable equipment 21 for processing the output signals, for example to show on a display the direction of the source, to control other apparatus which is to operate in response to the direction of the source, or to use the information, alone or in combination with other information, or for any other required purpose. This equipment can be of any known kind.

Figure 4:
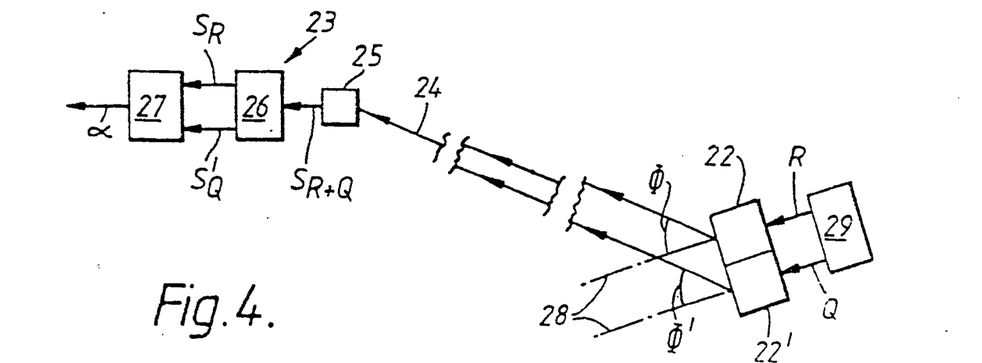
FIG. 4 shows diagrammatically another embodiment, for detecting the direction of energy emission from a transmitter to a receiver.

FIG. 4 illustrates in a simplified form the principle, analogous to that demonstrated with reference to FIG. 2 and 3, whereby the direction of an energy source as seen from a detector can be determined without any prior information about the intensity of the transmitting source or about its distance from the sensor (receiver). The angle at which energy received by a receiver has left the transmitter can be determined. This can for example be used to establish the orientation of a transmitter. In this example, two distinct transmitters propagate energy to a single remote receive, provided there is orthogonal modulation as between the two transmitted signals. The two transmitters with have different polar characteristics. In this case, the amplitude of each transmitted signal has to be measurable independently of any other signal.

In FIG. 4, two transmitters 22, $22^1$, of different polar characteristics $F(\Phi)$ and $F^1(\Phi)$, are placed as close together as possible so as to be effectively coincident, and are sufficiently remote from a detector 23 for the beams 24 (one end of the path of which is defined by the transmitters) which they transmit to the single sensor 25 of the detector to leave the respective transmitters at virtually identical angles $\Phi$, $\Phi^1$ with respect to the normal 28. The transmitters 22, $22^1$ may for example be loudspeakers, radio transmitting antennae or infra-red LED's. Each transmitter is modulated by a modulator 29 with a signal R and Q respectively, the signals R and Q being mutually orthogonal. The sensor 25 will thus receive a resultant signal modulation R+Q. Because R and Q are orthogonal to each other, it is possible to separate the resultant signal, after reception by the sensor 25, into its component parts, denoted by $S_R$ and $S^1_Q$, which represent the magnitudes of the received signal components carrying the modulating signals R and Q respectively.

These separation can be obtained using suitable known electronic circuitry. In this example, a circuit 26, including suitable filters, processes the receiver output signal $S_{R+Q}$ to give separate signals $S_R$ and $S^1_Q$, which are passed to a ratiometric circuit 27 similar to the amplifier 20 in FIG. 3, to give an output signal $\alpha$ representing $S_R/S^1_Q$, which is a function solely of the angular displacement $\Phi$ and independent (as before) of the power and distance terms, since source intensity and distance are the same for both transmitters.

In a further variation (not shown), the detector 23 may be replaced by a detector generally similar in layout to the detector 13 of FIG. 3, the two transmitters 22, $22^1$ being replaced by transmitters having different polar characteristics and also giving energy at the same intensity but in different wavebands. The sensors 14, $14^1$ are replaced by sensors each of which is sensitive only to the wavelength (or waveband) of the energy from a respective one of the transmitters. The output signals S and $S^1$ will then each be a function of the relative sensitivity of the corresponding sensor to the signal received by the latter at the appropriate wavelength. As before, the ratiometric output signal $\alpha$ from the amplifier 20 represents the angle $\Phi$ with all other variables cancelled out. This embodiment has particular application where the two transmitters are, for example, transmitters of two different forms of energy, e.g. one ultrasonic and one microwave transmitter, each sensor being of course sensitive to the appropriate form of energy.

Figure 5:
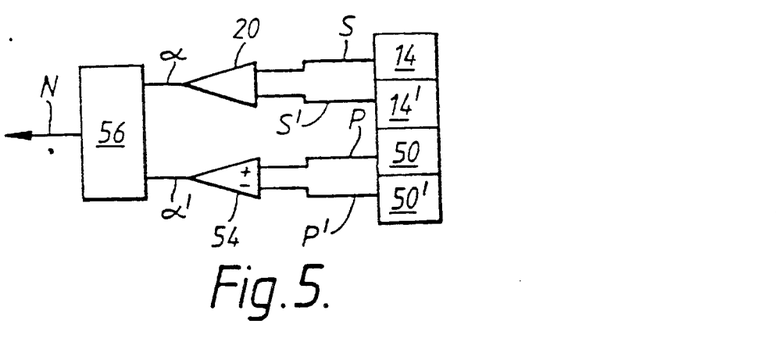
FIG. 5 shows a modified version of the energy detector of FIG. 3.
Figure 6:
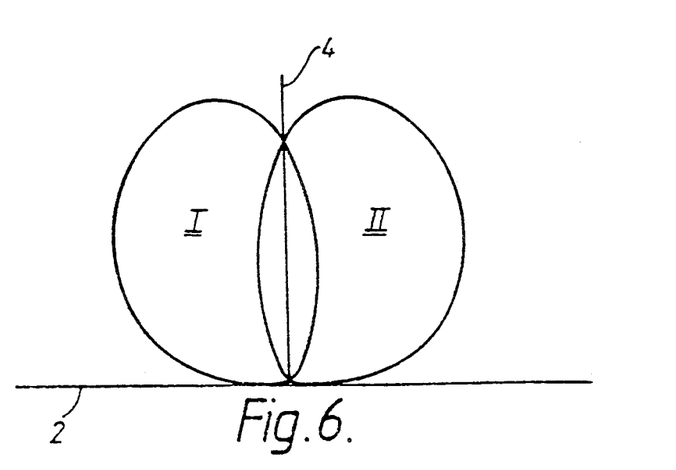
FIG. 6 shows polar characteristics of sensors in the detector of FIG. 5.

In the basic form described and shown in FIG. 3, the detector cannot detect on which side of the normal 4 the incident beam of energy strikes the sensor surface 2. FIGS. 5 and 6 show a modification which overcomes this deficiency in cases where it may present a problem. Here the sensors 14, $14^1$ of FIG. 3 are supplemented by another pair of sensors 50, $50^1$, which are arranged in any convenient way, as close as possible to each other and to the sensors 14, $14^1$.

In this case the polar characteristics of the sensors 50, $50^1$, while different from each other, are also asymmetrical with respect to the normal plane 4, that of sensor $50^1$ lying mainly to the left of the normal as at I in FIG. 6, while that of sensor 50 lies mainly to the right, as at II.

The output signals P and $P^1$ from the sensors 50 and $51^1$ will be different from each other except when the energy beam coincides with the plane 4. These outputs are fed to a comparator 54 giving an output signal $\alpha^1$, representing the difference between the two signals P and $P^1$, the sign of which will be positive if $P > P^1$, thus indicating that the beam is to the left of the normal 4, and negative if $P^1$ is the greater, i.e. the beam is to the right. In the direction of the normal, the output of the comparator 54 will make a transition from "low" to "high", or vice versa, in a direction indicating the direction in which the normal is being approached. The first output signals $\alpha$, $\alpha^1$ are fed to a suitable processing circuit 56, which gives an output signal N that is a function of direction, in terms not only of inclination to the axis 4, but also of whether the incident energy is, for example, to the right or left of the axis.

Figure 7:
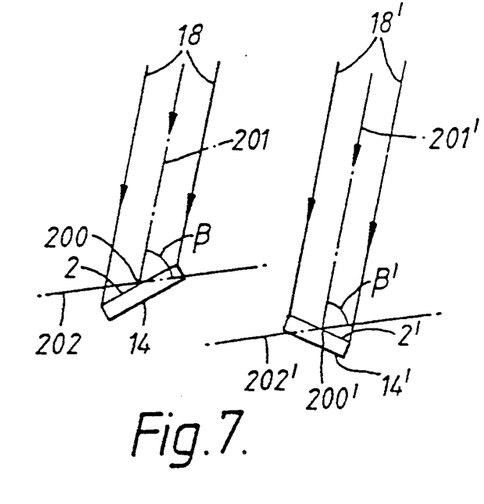
FIGS. 7 and 8 are diagrams illustrating the general principle of substantial equality between the included angles at the equivalent centres of reception and transmission respectively.

FIG. 7 shows a general case of a detector as at 13 in FIG. 3, but in which the two sensors 14, $14^1$ do not necessarily face in the same direction, though they can each receive a beam of energy 18, $18^1$ from a remote energy source not shown. The sensors have different polar characteristics, and are each adapted to produce a first output signal which varies as a function of at least the source intensity and the distance between the source and the sensor. At least one of the sensors is such that its output signal also varies as a function of the direction from which it receives the energy as defined by its polar characteristic.

The two beams 18, $18^1$ represent the energy either as received directly from the source, or as received by the energy sensitive surfaces, 2, $2^1$ respectively, of the sensors directly from the source and via suitable means (not shown) for redirecting the energy on to the sensor. In the case for example where the energy is viable light, the redirecting means may comprise a mirror or lens, or system of mirrors and/or lenses. In all cases the length of the path travelled by the energy from the source to the sensor is the same for both sensors.

All of the energy incident on the surface 2 and $2^1$ may be deemed to be acting at an equivalent point of reception 200, $200^1$ and to be reaching the relevant sensor along an energy line 201, $201^1$ as defined above. When any energy line is incident at the respective equivalent point of reception for each sensor, so as to define an included angle $\beta$, $\beta^1$ with one of a pair of given parallel lines 202, $202^1$ containing the respective equivalent points of reception, then the angel $\beta$ is substantially equal to the angle $\beta^1$. The lines 202, $202^1$ are arbitrarily chosen. It will be noted that in FIG. 3, the included angle $\beta$, $\beta^1$ is also the angle of incidence $\Theta$ or $\Theta^1$.

Figure 8:
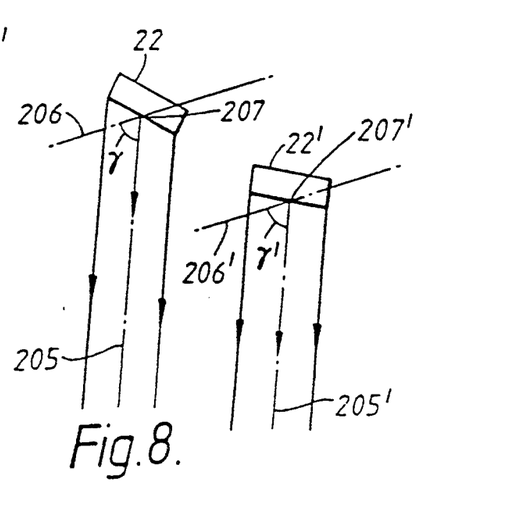

FIG. 8 shows the analogous case for a pair of transmitters of an energy source, used for example as in FIG. 4 and having different polar characteristics. They are so arranged that, with the energy lines 205, $205^1$ of the energy propagated by each transmitter 22, $22^1$ respectively defining an included angle $\gamma$, $\gamma^1$ with a respective one of two arbitrarily chosen parallel lines 206, $206^1$ containing the equivalent centres of transmission 207, $207^1$, the angle $\gamma$ is substantially equal to $\gamma^1$.

The polar characteristic of a sensor or a transmitter can be modified by masking the energy receiving or emitting surface, and this may be done in many different ways, a few examples of which are shown in FIGS. 9 to 12. Masking is a simple way of modifying the polar characteristic which enables detectors, for instance, to be made using sensors which can all be identical, inexpensive and commercially available articles. The difference in the polar characteristics between the two sensors (or transmitters) of a pair, associated with each other in any of the ways described in this application, can be obtained, if desired, by appropriate masking of one or both of them.

Figure 9:
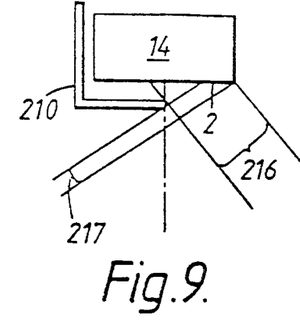
FIGS. 9 to 12 illustrate various forms of mask which may be used to modify the polar characteristics of a sensor or a transmitter.
Figure 10:
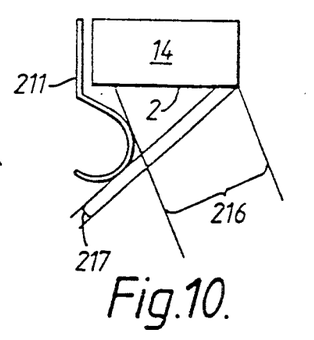
Figure 11:
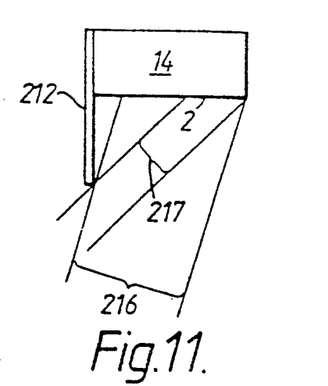

Masking may be taken to be any modification to the sensor or the transmitter which reduces or eliminates the sensitivity to incident radiation, or the capacity to emit radiation, as the case may be, at any point on the relevant surface. Thus in FIGS. 9 to 12, a sensor 14 having a flat receiving surface 2 is masked in various different ways. A typical parallel energy beam is indicated at 216, and a beam in the extreme position beyond which it is blocked by the mask, as 217. In FIG. 9, an L-shaped mask 210 has one leg lying in front of the left hand portion of the surface 2, and this portion will therefore only receive radiation coming from a direction to the right of the normal plane indicated by a chain dotted line. The curved mask 211 shown in FIG. 10 is a variation on this, as is the perpendicular mask 212 in FIG. 11. The effect of the mask 212 is that the amount of energy reaching the surface 2 from a direction to the left of the normal to the surface 2 is a simple trigonometric function of the angle of incidence.

Figure 12:
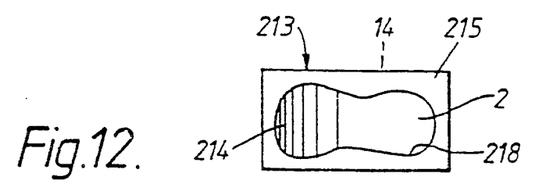

FIG. 12 shows a profiled mask 213 overlying the surface 2. This is just one of many possible masks for changing the effective shape of the sensitive surface, and in this example it comprises an opaque portion 215 with a suitably shaped aperture 218 exposing part of the surface 2. A profile opaque portion, surrounded by a non-opaque portion of the mask, may equally well be used instead of, or in addition to, an aperture in the mask.

FIG. 12 also shows lines or shading 214 which may be used if it is desired to reduce but not suppress the sensitivity of any part of the exposed surface 2. A mask overlying the surface 2 can of course be provided with any form of shading or marking to obtain partial blocking of radiation in any part of the surface of the sensor or transmitter, with or without a shaped portion such as the aperture 218. Such shading or marking may be graded, for instance by any one of a number of known printing techniques on a transparent or translucent mask substrate.

The general principles illustrated in the above examples are used in the embodiments described below, which are a few examples of how the direction finding facility afforded by the invention can be used in position and motion detection, and in flame detection.

POSITION FINDING

Figure 13:
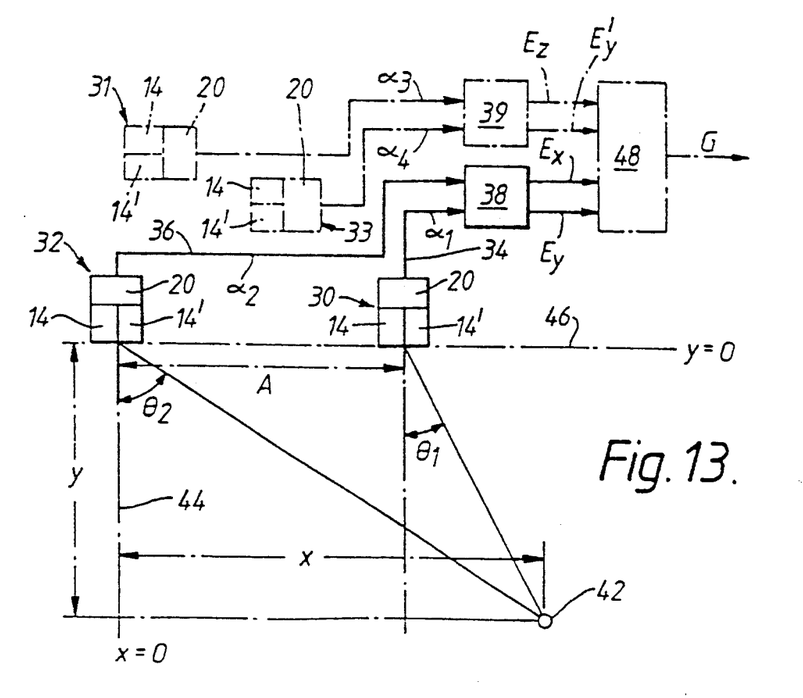
FIG. 13 shows a position-detecting apparatus in one form according to the invention.

Reference is made to FIG. 13, which shows two generally-similar detectors 30 and 32, spaced apart in a horizontal plane by a predetermined distance A. Each detector comprises two sensors 14, $14^1$ and a ratiometric amplifier 20, generally as in FIG. 3 for example, but with a difference to be explained below. The outputs 34 and 36 of the detectors 30 and 32 respectively are fed to a suitable processor 38. The latter produces output signals 40, representing the Cartesian co-ordinates x and y, in the horizontal plane, of the position of an energy source 42. These co-ordinates can be established with respect to any desired datum; this may be related to the location of the apparatus, and in FIG. 13 it is arbitrarily chosen so that the detector 32 lies at the datum position $x=0$, $y=0$, the ordinate 44 being normal to the detector 32 and the abscissa 46 being in a plane common to the two detectors.

Any compound angle of incidence may be resolved into two component parts in two orthogonal planes. In this example these planes are the horizontal plane (x, y) and the vertical plane having co-ordinates y and z, z being perpendicular to the plane in which FIG. 13 is drawn. If the two sensors 14, $14^1$ of each detector 30, 32 have identical relative sensitivities at any given compound angle of incidence, it follows that their relative sensitivities will be identical for any given combination of angles in the horizontal and vertical planes. The output signal $\alpha$ or $\alpha_z$ of the ratiometric amplifier 20 will then be constant. If, however, an angular offset in the horizontal plane is introduced between the two sensors, the output signal will be responsive to the horizontal component of any compound angle of incidence but totally independent of any vertical component. It will be appreciated that an angular offset in any plane will produce an output response which depends on the angular component of incidence in that plane.

Accordingly, in each of the detectors 30 and 32, the sensors 14 and $14^1$ have identical polar characteristics in the vertical plane, while in the horizontal plane, their polar characteristics are different. Alternatively, they may be orientated in the horizontal plane with an angular offset in the horizontal plane as described with reference to FIG. 7 above. The output signal $a$ then represents the direction of the source 42 in horizontal terms. The vertical polar characteristics will be cancelled out by the amplifier 20, so that each detector is responsive only to the horizontal components of the direction of the source 42 from the detector.

It will be clear from FIG. 13 that the angles of incidence $\Theta_1$ and $\Theta_2$, respectively represented by the output signals $a_1$ and $a_2$, may be used in a simple and rapid trigonometric computation to evaluate the co-ordinates x and y for the position of the source 42. In this case, the sensors may be designed so that the ratio of their horizontal polar characteristics matches a particular trigonometrical function of the angle $\Theta$, rather than the angle itself. Alternatively, the ratiometric amplifiers 20 can be arranged so that the output signals $a_1$ and $a_2$ represent such a trigonometric function. These functions are combined by the processor 38 with the known distance A in a computation that gives outputs $E_x$ and $E_y$ representing the co-ordinates x and y in the horizontal plane.

Corresponding output signals representing vertical coordinates may be obtained simultaneously if another pair of detectors 31 and 33 are arranged in the vertical plane. The detector 31 is spaced orthogonally from the horizontal plane by a known distance. The detector 33 is located in the same horizontal plane as the detectors 30 and 32, as well as in the same vertical plane as the detector 31. Preferably the detector 33 is as nearly as possible coincident with one of the detectors 30 and 32 (the latter in this example), though this is not essential.

The detectors 30 to 33 are substantially identical, except that, by contrast with the detectors 30 and 32, in each of the detectors 31 and 33 it is the horizontal polar characteristics of the sensors 14 and $14^1$ that are identical, their vertical polar characteristics being different from each other. FIG. 13 does not show the spatial relationship between the detectors 31 and 33, or between them and the detectors 30 and 32. The output signals $a_3$ and $a_4$ respectively from the amplifiers 20 of the detectors 31 and 33 are processed by a suitable processor 39 to give respective outputs $E_x$ and $E^1_y$ representing the vertical co-ordinate Z. The signals $E_x$, $E_y$, $E^1_y$ and $E_z$ may be combined in a separate processor 48, to produce an output G, for example a computer display, representing the exact position of the source 42 in space.

The novel principle illustrated in FIG. 13, whereby the position of an energy source can be determined, again with no prior information about source intensity or distance, using a plurality of detectors located in space at known positions relative to each other, can be applied to the case were the detectors are replaced by energy sources. In this case, each of these sources comprises two distinct transmitters as in FIG. 4, and the energy source (such as 42 in FIG. 13) is replaced by a receiver, provided the signals from the transmitters are modulated orthogonally with respect to each other. Again, the amplitude of each signal must be measurable on its own. The receiver output signals can be processed, as for example in the arrangement of FIG. 13, to produce a set of ratiometric signals $a$, from which the relative positions of the receiver and the transmitters can be established using known processing means.

The introduction of an angular offset in one plane, between two sensors of identical relative sensitivities at a given compound angle of incidence, may also be applied to such a system using two transmitters, by arranging for the ratio of the radiant intensity from each transmitter to vary in relation to only one of the angular components at any given compound angle of radiance.

In very high speed applications, or for reasons of electronic economy, it is possible to perform all or some of the necessary computations on an analogue basis. An advantage of the position-finding method of FIG. 13 is, that the arrangement may be scaled dimensionally up or down, simply by increasing or decreasing the horizontal distance between the (or any) two detectors. If the detectors are required to generate outputs in response to a number of energy sources, then the signals received from the various sources must be measurable independently of each other, so that the ratiometric calculation (e.g., $S/S^1$) can be made independently for each of the sources. A separate output signal corresponding to each source can then be obtained.

In systems where the source is modulated in a known manner, signal processing techniques such as analogue filtering, digital filtering, synchronous detection or matched filtering may be used with advantage to extract and measure the received signals S and $S^1$. Inexpensive equipment is currently available to calculate the ratio between two variables.

DOPPLER MOTION DETECTION

Figure 14:
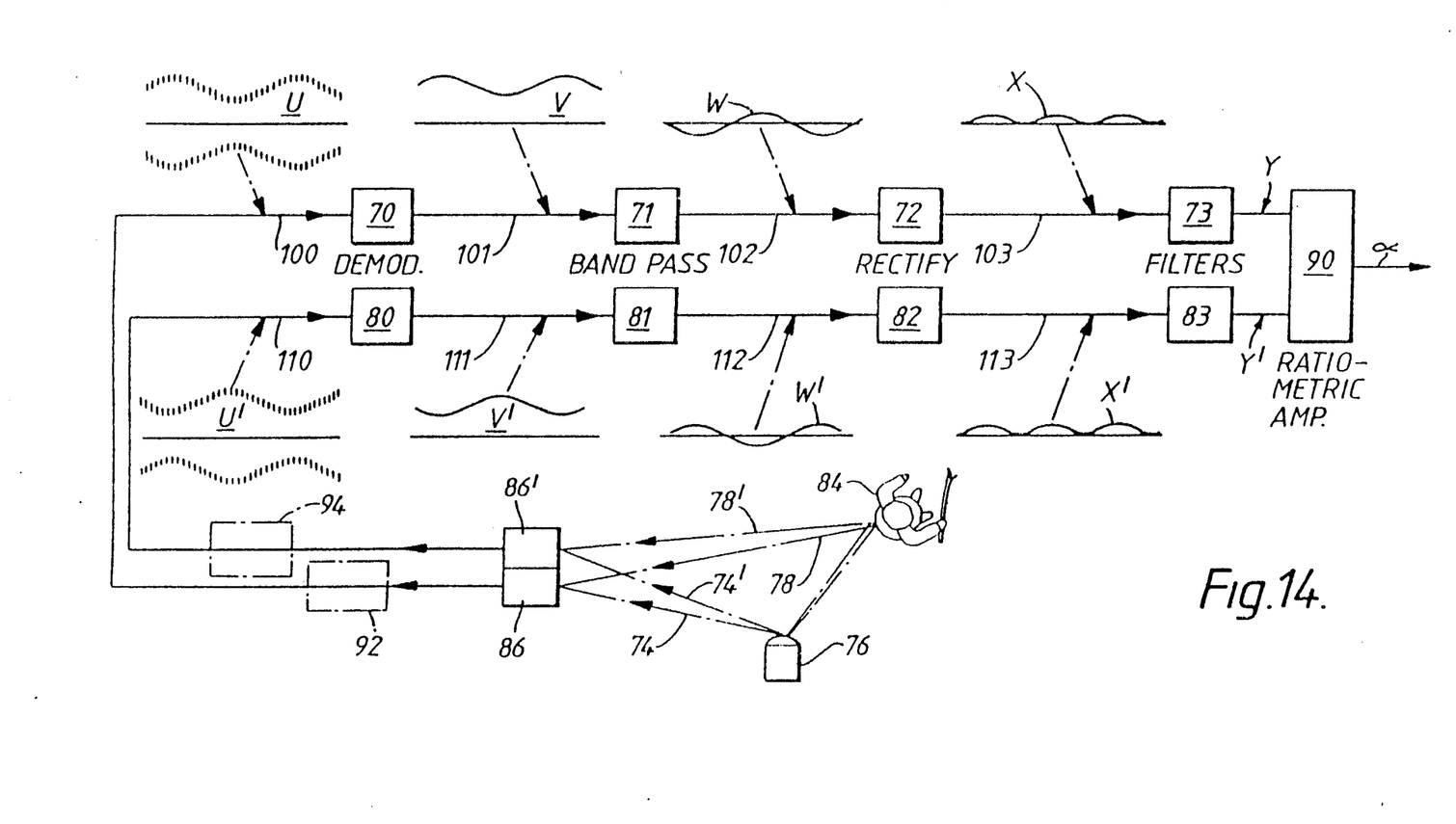
FIG. 14 is a block diagram of a Doppler-type motion detecting apparatus incorporating features of the invention.

Referring to FIG. 14, two ultrasonic receivers, comprising sensors 86, $86^1$ respectively, give output signals U and $U^1$. These receivers have different relative sensitivities at any given angle of incidence. In this example U and $U^1$ are 90° out of phase, though as will be shown this does not affect the output signal from the apparatus. Ultrasonic energy is received in two forms, namely a reference signal 74, $74^1$ directly from an ultrasonic transmitter 76, and a reflected signal 78, $78^1$ from a moving reflecting body 84 in the vicinity. The signals U and $U^1$ are thus amplitude modulated by virtue of the addition to the reference signal of the reflected signal, which has a slightly different frequency due to the Doppler effect.

The signals U and $U^1$ are applied via lines 100 and 110 to two demodulators 70 and 80 respectively, which pass demodulated signals V, $V^1$ via lines 101, 111 to bandpass filters 71, 81 respectively. The lower and upper cut-off frequencies of the filters 71 and 81 determine the minimum and maximum motion speeds (measured in a radial direction) to which the device will respond. In this instance, as shown by the output waveforms W and $W^1$, the lower cut-off frequencies of the filters 71 and 81 are above zero frequency, i.e. the d.c. component has been rejected, and the modulation frequency is within the passband of the filter 71 and 81. The output signals of the filters 71 and 81 are applied via lines 102, 112 to full-wave rectifiers 72, 82, producing output waveforms X, $X^1$ which are no longer out of phase and which are in turn applied via lines 103, 113 to circuits (typically low-pass filters) 73 and 83 respectively, which produce d.c. first output signals Y, $Y^1$ respectively, proportional to the r.m.s. or peak amplitude (as desired) of the waveforms X, $X^1$.

A ratiometric amplifier 90 computes the ratio of the signals Y and $Y^1$, to produce a second output signal $a$, which is solely dependent on the amplitude ratio of the a.c. modulation components within the input signals U and $U^1$, regardless of the phase relationship of these modulation components and provided that the modulation frequency lies within the passbands of the filters 71 and 81. The characteristics of the filters 71 and 81 should be closely matched to minimise error in the output signal $a$. This signal is totally independent of the phase relationships of both the carrier components and the modulation components of the input signals U and $U^1$.

It will be realised that because this embodiment of the invention relies on the Doppler effect, modulation of the signal 74, $74^1$ will only occur when the radial component of the distance between the object 84 and the sensors 86, $86^1$ is changing. Modulation will not occur (and will therefore not appear on the lines 102, 112) either if the object is not moving, or if it is moving at constant radial distance from the sensors.

The sensors 86, $86^1$ may be microwave motion sensors, the transmitter 76 then being a microwave transmitter. The output signal from the microwave sensors has the waveforms V and $V^1$, and the demodulators 70 and 80 are therefore omitted, the output signals from the receivers (sensors) being fed directly onto the lines 101, 111. Operation is in other respects the same as that of the ultrasonic embodiment of FIG. 14.

As previously explained, the output signal $a$ is a function of the common angle of incidence of the reflected signals on the receivers, provided that the polar characteristics of the two sensors are different. A number of such systems, arranged at different spatial positions, may be used to obtain the position of a moving object.

If two objects are moving simultaneously at the same velocity, it would not be possible to define either of their positions, since the system has no way of distinguishing between the two resulting Doppler signals because their effects are additive. Objects moving at different speeds, however, will produce differing Doppler frequency shifts, and so produce an amplitude modulation of the carrier signal containing a number of distinct spectral components (distinct frequencies which are not necessarily harmonically related). The number of spectral components present is in direct relation to the number of moving objects which have a unique radial velocity component. Fourier analysis of the demodulated signal from each receiver (V and $V^1$ in FIG. 14) enables the magnitude of each spectral component in each channel to be measured. Calculation of the ratio between corresponding spectral components common to both channels will yield a series of outputs $a_1$, $a_2$, $a_3$ etc. This will represent angular bearing information about each of the objects, provided that they each have a unique radial velocity component away from or towards the apparatus. This technique allows the path of a plurality of moving reflectors to be plotted in two or three co-ordinates by using the bearing information from a suitable number of apparatuses such as that shown in FIG. 14, positioned at different points in space.

PASSIVE INFRA-RED MOTION DETECTION

The arrangement shown in FIG. 14 can be adapted to enable the invention to be applied to passive infra-red (PIR) motion detection. For this purpose, the transmitter 76 is omitted, and the sensor means of the detector comprises the sensors 86 and $86^1$, but in this case these are pyroelectric sensors having different relative sensitivities at any common angle of incidence, i.e. having different polar characteristics.

In order to overcome any problems of achieving sufficient coherence in the chopping action on each sensor 86 or $86^1$, and to enable readily-obtainable and inexpensive pyroelectric sensor to be used, the output signal from the sensors can be amplified by amplifiers 92, 94 respectively, then rectified by the rectifiers 72, 82, before being passed through the low-pass filters 73, 83 to produce, as before, a d.c. signal Y, $Y^1$, which is proportional to the magnitude of each a.c. signal resulting from the chopping action as the body 84 traverses the field. These d.c. signals are then fed to the ratiometric amplifier 90 to give the directional output signal $a$.

Accordingly, the demodulators 70, 80 and band pass filters 71, 81 may be omitted. Indeed, if small enough pyroelectric sensors are available to avoid the above-mentioned coherence problems, then it may be possible to omit all or some of the stages between the sensors and the ratiometric amplifier 90.

If a number of these PIR detectors are used, for example generally in the manner shown in FIG. 13, the position of the body 84 at any instant can be plotted. The directional outputs E (FIG. 13) are then fed to a suitable computer (48, FIG. 13) for analysing the information to determine the path of the moving body 84.

FLAME DETECTION

Figure 15:
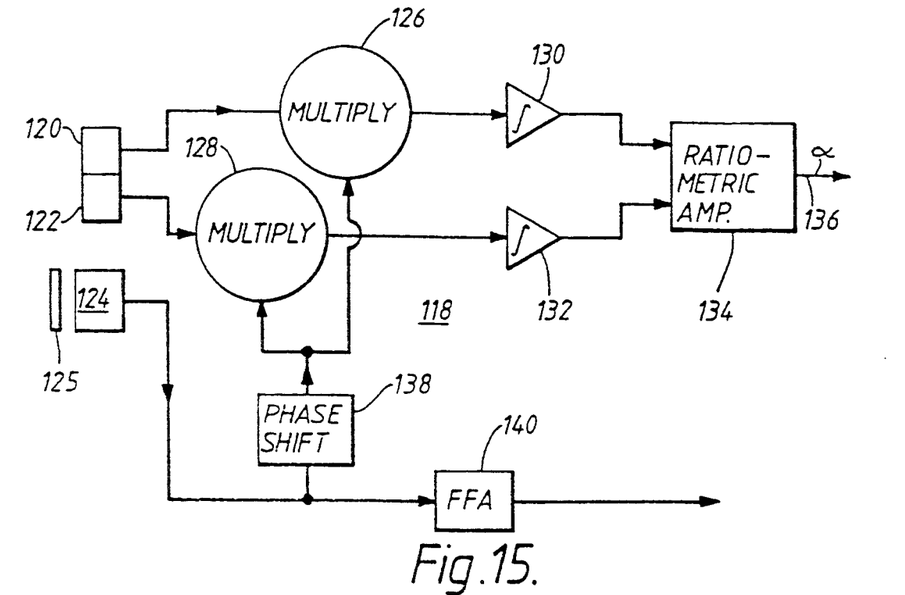
FIG. 15 is a much simplified block diagram of a flame detecting apparatus for sensing the direction of a hydrocarbon flame.

Turning now to FIG. 9, a flame detecting apparatus 118, particularly for detecting a hydrocarbon flame out of doors, includes a pyroelectric sensor 124, in combination with a narrow-band optical filter 125 at 4.3 $\mu$m wavelength, to give an eventual output signal $a$ which is responsive only to the radiant flux from a hydrocarbon flame and insensitive to solar radiation received either directly from the sun or indirectly.

The detector 118 also has two conventional photoelectric sensors 120, 122 with different relative sensitivities for the same angle of incidence, i.e. different polar characteristics. The output signal from the pyroelectric sensor 124 is fed to two multipliers 1236, 128, in which the output signal from each sensor 124. The outputs from the multipliers 126, 128 are integrated by respective integrators 130, 132.

The resultant signals from the integrators 130 and 132 represent cross-correlation functions of the output signals from, respectively, the sensors 120 and 124, and the sensors 122 and 124. Each cross-correlation signal contains, by virtue of the mathematical process of cross-correlation carried out by the multipliers and integrators, only those signal components common to the two input or operand signals being cross-correlated.

In this case, although solar radiation does of course affect the output signals from the sensors 120 and 122, the only signal component common to all three sensors is that due to the flame being sensed, since both operand signals are due to the flame. This is because, due to the filtering out by the filter 125 of all radiation except a very narrow waveband at 4.3 $\mu$m wavelength, the significant wavelengths of solar radiation, present below the $CO_2$ layer of the atmosphere, do not affect the operand signal form this sensor, which is thus "solar blind". There is by contrast a significant proportion of radiation in the region of 4.3 $\mu$m for a hydrocarbon flame.

The outputs from the integrators 130 and 132 are fed to a ratiometric amplifier 134, giving at its output 136 a signal $a$ which is responsive only to the ratio of the output signals from the sensors 120 and 122.

The multipliers 126, 128 may be of a conventional analogue or digital kind, provided of course that both signals are converted into additional signals; or they may be non-linear devices of any suitable kind using an appropriate square-law relationship. The integrators 130, 132 may for example be simple resistive-capacitive low-pass filters, or digital low-pass filters or integrators.

The pyroelectric sensor 124 produces a phase shift, whereas the photoelectric sensors 126, 128 do not. In order for the cross-correlation process to be effective, the modulation components from the flame radiation in each of the three sensor outputs should be at least substantially in phase with each other. Because the sensor 124 is capacitive above a certain breakpoint frequency, its voltage output signal may be out of phase with the incident flux, whereas the sensors 120 and 122, being light-dependent sources of either current or voltage, produce output signals in phase with the incident flux.

Accordingly, a phase shift network 138 is provided between the sensor 124 and the multipliers 126, 128, so that the latter receives a signal in phase with those from the sensors 120 and 122.

In the circuit of FIG. 15, a feature of the cross-correlation process is to remove non-common signal components, so that the output signals from the integrators 130, 132 contain only the common signal components of the signals from the three sensors. To this end, a flicker frequency analyzer (FFA) circuit 140 is connected to the output of the sensor 124. The circuit 140 gives a positive signal when a flame is detected, and this serves as a validating indication for any output from the amplifier 134. The inputs to the amplifier 134 represent flame signals, so that its output signal α can be seen to represent the direction of a flame.

This flame detecting apparatus is thus sensitive to the direction as well as the presence of a hydrocarbon flame. Being also blind to solar radiation, it can thus operate with decreased risk of false alarms.

Figure 16:
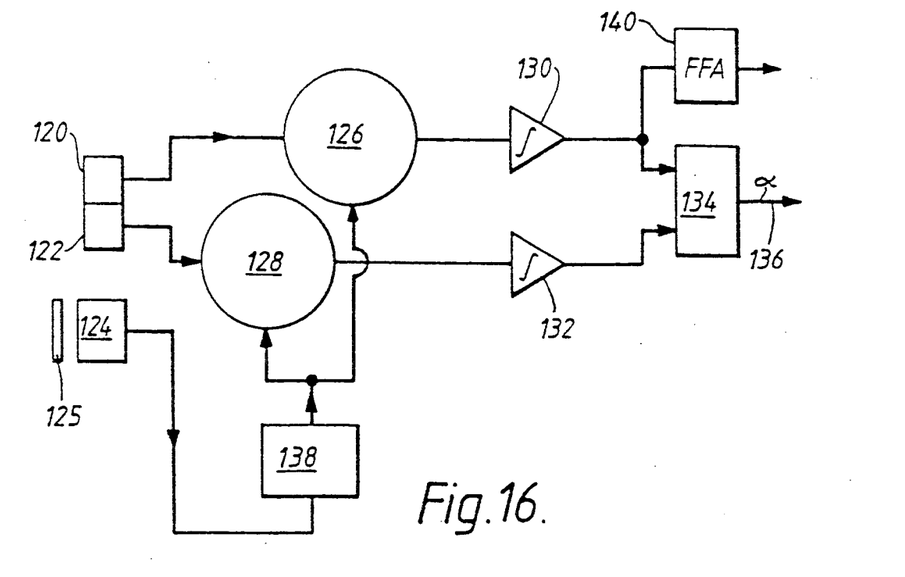
FIG. 16 shows a variation on FIG. 15.

FIG. 16 shows another embodiment in which the input to the FFA circuit 140 is taken from the output of one of the integrators. In this case the sensor 120 has a polar characteristic similar to that of the sensor 124, being preferably omnidirectional, though like the sensor 122 and unlike the sensor 124, the sensor 120 remains a photoelectric sensor. In this instance, the sensor 120 is therefore somewhat insensitive to the direction from which energy is received from the source. Consequently the sensor 122 must then be of a kin sensitive to direction. The output from the integrator 130 is of course a cross-correlation signal which depends on the presence oe absence of a flame.

The arrangement in FIG. 16 has the additional advantages, besides those mentioned above, that it does not suffer from the adverse effects of microphony or inherent noise generation.

The ratiometric amplifier 134 may be so arranged that the signal from the sensor 122 via the integrator 132 is the numerator of the ratio represented by the output signal α, so that the signal α is then a linear function of the direction being detected.

I claim:

1. Direction sensitive energy detecting apparatus, comprising:
    an energy detector including sensor means for detecting energy received along at least one energy path extending through space from at least one energy source to the sensor means,
    a pair of one of energy receiving and transmitting devices of different polar characteristics, comprised in either the sensor means or a said source and so disposed that (a) they define together one end of a said path in such a way as to be substantially coincident with each other, and (b) at any instant, all of the radiation received by the detector form a source, having substantially a single value of source intensity, travels substantially the same distance between the source and the sensor means,
    the sensor means being adapted to give two first output signals at least one of which is variable as a function of at least the direction of the said path, and
    the detector further including ratiometric means for generating a second output signal which is a function of the ratio of the two first output signals, whereby the second output signal is variable only in response to changes in the said direction.

2. Apparatus according to claim 1, wherein the pair of one of energy receiving and transmitting devices are arranged closely adjacent to each other and facing in substantially parallel directions.

3. Apparatus according to claim 1, further comprising masking means for restricting at least one of the direction, image shape and intensity of the radiation incident on at least one energy receiving device of a said pair or propagated by at least one energy transmitting device of a said pair.

4. Apparatus according to claim 1, wherein the said pair of devices are sensors forming part of the detector, the apparatus being direction finding apparatus for the continuous determination of the presence and direction of a remote body or other source of energy and further including means for interpreting said second output signal in terms of the said direction.

5. Apparatus according to claim 3, further comprising masking means for restricting at least one of the direction, image shape and intensity of the radiation incident on at least one energy receiving device of a sad pair or propagated by at least one energy transmitting device of a said pair.

6. Apparatus according to claim 3, wherein the detector includes a pair of second sensors each having a polar characteristic asymmetrical about an axis of the sensor, the axis being the same for each second sensor, and their polar characteristics being mirror images of each other with respect to the axes, each second sensor being adapted to produce a third output signal; and means for generating a fourth output signal, which is a function of the ratio of the third output signals and therefore indicates on which side of the axis the direction of the energy path lies.

7. Apparatus according to claim 1, comprising position finding means including (a) two said detectors, each comprising a said pair of energy receiving devices as the sensors of the detector, and a said ratiometric means, each pair of sensors being spaced apart from the next pair by a predetermined distance in a first plane, the two sensors of each pair having polar characteristics which are different in the first plane but substantially identical in a second plane normal to the first plane, and (b) processor means connected with the ratiometric means of the detectors for producing an output responsive to the second output signals from the detectors and representing coordinates of the position of the source in the said first plane.

8. Apparatus according to claim 7, including a further said position finding means in which the two sensors of each pair have polar characteristics which are different in the second plane but substantially identical in the first plane, the apparatus including further processor means connected with the said processor means of each position finding mean for producing an output representing the position of the source in space.

9. Apparatus according to claim 7, further comprising masking means for restricting at least one of the direction, image shape and intensity of the radiation incident on at least one energy receiving device of a said pair or propagated by at least one energy transmitting device of a said pair.

10. Apparatus according to claim 1, in which the sensor means of the detector comprises a said pair of energy receiving devices as sensors and wherein the apparatus comprises a transmitter for generating a reference signal receivable through space by the sensors both directly and at the same time by reflection from at least one body the motion of which is to be detected by the detector, each sensor being adapted to produce a Doppler output signal in response to the directly received and reflected reference signals, and the sensor means including means to convert the output signal from each sensor into a said first output signal whereby the second output signal from the ratiometric means is a function of the movement of the said body or bodies.

11. Apparatus according to claim 10, wherein the transmitter is adapted to propagate ultrasonic or microwave energy, the sensors being adapted to receive the type of energy so transmitted.

12. Apparatus according to claim 1, having at least one detector the sensor means of which comprises a said pair of energy receiving devices as sensors, the apparatus being a passive infra-red motion detecting system wherein each sensor comprises a pyroelectric sensor with optical chopping means for chopping radiation incident on the sensor from a moving body.

13. Apparatus according to claim 1 in which the sensor means of the detector comprises a said pair of energy receiving devices as first and second sensors, the detector further including a pyroelectric third sensor disposed so that radiation incident on one sensor is incident on all three, and having filter means whereby the third sensor senses radiation only within a predetermined waveband, and the sensor means including first and second means for cross-correlating the output signal from the third sensor with that from the first sensor and the second sensor respectively, so as to remove non-common signal components from the first output signals transmitted from the sensor means to the ratiometric means.

14. Apparatus according to claim 13, wherein the apparatus is a flame detector, the filter means being a narrow band optical filter in a waveband characteristic of a type of flame to be detected but substantially uncharacteristic of solar radiation.

15. Apparatus according to claim 13, including a flicker frequency analyzer connected so as to receive signals responsive to at least the output signals from the third sensor.

16. Apparatus according to claim 15, wherein the said first and third sensors have similar polar characteristics, the flicker frequency analyzer being connected so as to receive output signals from the first cross-correlating means in parallel with the ratiometric means.

17. Apparatus according to claim 1, wherein the first and third sensors are substantially omnidirectional.

18. Apparatus according to claim 1, wherein the said pair of devices are transmitters, and further comprising modulating means for modulating, orthogonally to each other, the signals propagated as energy to the detector by the transmitters.

19. Apparatus according to claim 12, further comprising masking means for restricting at least one of the direction, image shape and intensity of the radiation incident on at least one energy receiving device of a said pair or propagated by at least one energy transmitting device of a said pair.

20. Apparatus according to claim 1, wherein the said pair of devices are transmitters arranged to propagate energy in different wavebands, the sensor means of the detector comprising a pair of sensors each responsive to energy in a respective one of the said wavebands.

* * * * *